(12) United States Patent
Huang

(10) Patent No.: US 7,301,515 B2
(45) Date of Patent: Nov. 27, 2007

(54) DETECTABLE FLAT PANEL DISPLAY AND RECOGNITION SYSTEM THEREFOR

(75) Inventor: Wei-Pang Huang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 706 days.

(21) Appl. No.: 10/797,871

(22) Filed: Mar. 10, 2004

(65) Prior Publication Data

US 2004/0222952 A1 Nov. 11, 2004

(30) Foreign Application Priority Data

May 8, 2003 (TW) .............................. 92112532 A

(51) Int. Cl.
G09G 3/32 (2006.01)
(52) U.S. Cl. ...................................... 345/82
(58) Field of Classification Search ................ 345/76, 345/82, 87, 90, 100, 107, 205, 207, 80, 98, 345/102, 156; 427/554; 313/500, 504, 499; 257/775, 40, 79; 315/169.3; 349/27
See application file for complete search history.

(56) References Cited

U.S. PATENT DOCUMENTS

| | | | |
|---|---|---|---|
| 6,278,237 B1 * | 8/2001 | Campos | 313/512 |
| 6,333,737 B1 * | 12/2001 | Nakajima | 345/205 |
| 6,392,617 B1 * | 5/2002 | Gleason | 345/82 |
| 6,424,388 B1 * | 7/2002 | Colgan et al. | 349/27 |
| 6,445,368 B1 * | 9/2002 | Nakajima | 345/76 |
| 6,628,355 B1 * | 9/2003 | Takahara | 349/106 |
| 2002/0109136 A1 * | 8/2002 | Seo et al. | 257/40 |
| 2002/0140364 A1 * | 10/2002 | Inukai | 315/169.3 |
| 2003/0016196 A1 * | 1/2003 | Lueder et al. | 345/82 |
| 2003/0025659 A1 * | 2/2003 | Kondo et al. | 345/87 |
| 2003/0047736 A1 * | 3/2003 | Hayashi et al. | 257/79 |
| 2003/0075733 A1 * | 4/2003 | Yamazaki et al. | 257/200 |
| 2003/0094894 A1 * | 5/2003 | Andry et al. | 313/506 |
| 2003/0117369 A1 * | 6/2003 | Spitzer et al. | 345/156 |
| 2005/0163938 A1 * | 7/2005 | Yamazaki et al. | 427/554 |

* cited by examiner

Primary Examiner—Prabodh Dharia
(74) Attorney, Agent, or Firm—Thomas, Kayden, Horstemeyer & Risley

(57) ABSTRACT

A detectable flat panel display and a recognition system therefor. The detectable flat panel display includes a substrate including a circuit region and a display region, a circuit device disposed on the circuit region of the substrate, a display device disposed in the display region of the substrate, and a metal pattern. The metal pattern can be formed in the circuit or display region and can reflect light such that the reflected light is detectable by recognition equipment.

18 Claims, 8 Drawing Sheets

DETECTABLE FLAT PANEL DISPLAY AND RECOGNITION SYSTEM THEREFOR

BACKGROUND OF THE INVENTION

1. Field of the Invention

The present invention relates to a flat panel display, and more particularly to a flat panel display including a detectable metal pattern and a recognition system therefor.

2. Description of the Related Art

Presently, flat panel displays are important electronic products, used in personal computers, notebook computers, televisions, and mobile phones. Organic light-emitting diodes (OLED) are LEDs with an organic layer acting as the active layer, increasingly applied in flat panel displays due to advantages, such as low voltage operating, high brightness, light weight, slim profile, wide viewing angle, and highly effective contrast ratio.

OLEDs are classified as active matrix and passive matrix types according to driving methods. Active matrix organic light-emitting diodes (AMOLED) are generally driven by a thin film transistor (TFT).

Conventional OLEDs only provide display function, without detectable elements for recognition equipment.

SUMMARY OF THE INVENTION

An object of the present invention is to solve the above-mentioned problem and provide a detectable flat panel display.

To achieve the above objects, according to a first embodiment of the present invention, the detectable flat panel display includes: a substrate including a circuit region and a display region; a circuit device disposed in the circuit region of the substrate; a display device disposed in the display region of the substrate; and a metal pattern formed in the circuit region, capable of reflecting light such that the reflected light is detectable by recognition equipment. The metal pattern can be a source electrode, a drain electrode, or a gate.

According to a second embodiment of the present invention, the detectable flat panel display includes: a substrate including a circuit region and a display region; a circuit device disposed in the circuit region of the substrate; a display device disposed in the display region of the substrate; and a metal pattern formed in the display region, capable of reflecting light such that the reflected light is detectable by recognition equipment.

According to a third embodiment of the present invention, the detectable organic light-emitting diode display includes: a substrate including a thin film transistor (TFT) region and an organic light-emitting diode (OLED) region; a thin film transistor disposed in the TFT region of the substrate, having a first metal pattern capable of reflecting light such that the reflected light is detectable by recognition equipment; a planarizing insulating layer covering the thin film transistor, having a contact window to expose the first metal pattern; a transparent anode disposed in the OLED region of the substrate, electrically connected to the first metal pattern; a transparent insulating cover layer covering a portion of the anode in a contact window position; an organic light-emitting layer disposed on the anode and the insulating cover layer; and a transparent cathode disposed on the organic light-emitting layer.

According to a fourth embodiment of the present invention, the detectable organic light-emitting diode display includes: a substrate including a thin film transistor (TFT) region and an organic light-emitting diode (OLED) region; a thin film transistor disposed in the TFT region of the substrate; an anode disposed in the OLED region of the substrate; an organic light-emitting diode disposed on the anode; and a transparent cathode disposed on the organic light-emitting layer. One or both of the organic light-emitting layer and the transparent cathode has an opening, with a second metal pattern disposed therein, capable of reflecting light such that the reflected light is detectable by recognition equipment.

The present invention also provides a recognition system including a detectable flat panel display and recognition equipment. The detectable flat panel display includes: a substrate including a circuit region and a display region; a circuit device disposed in the circuit region of the substrate; and a display device disposed in the display region of the substrate.

The detectable flat panel display meets at least one of the following requirements:

a first metal pattern is disposed in the circuit region, wherein any layer above the first metal pattern is transparent or the first metal pattern is the outermost layer, such that the first metal pattern is detectable by the recognition equipment; or a second metal pattern is disposed in the display region, wherein any layer above the second metal pattern is transparent or the second metal pattern is the outermost layer, such that the second metal pattern is detectable by the recognition equipment.

The recognition equipment, such as a light pen, of the present invention can include a light source, a receiver, and a signal feedback device. When the light emitted from the light source irradiates the flat panel display, the light is reflected by the first and/or second metal pattern. The receiver receives a signal of the reflected light and transmits the signal to the signal feedback device. The signal feedback device transmits the signal back to the flat panel display.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The flat panel display of the present invention includes a circuit device and a display device, at least one of which includes a detectable metal pattern. That is, any layer over the metal pattern is transparent or the metal pattern constitutes the outermost layer, such that the metal pattern is detectable by recognition equipment.

Figure 1:
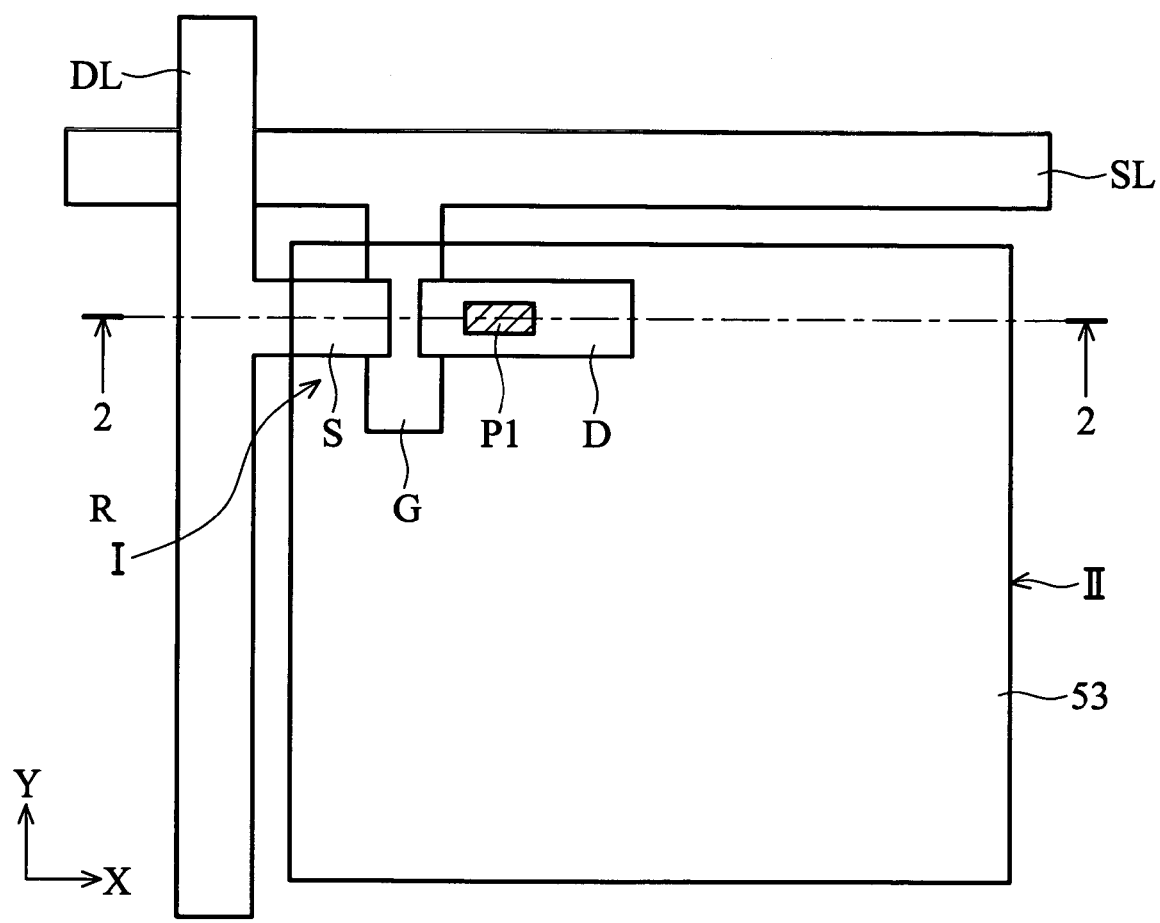
FIG. 1 is a top view of a pixel of an organic light-emitting diode display according to a first embodiment of the present invention.
Figure 2A:
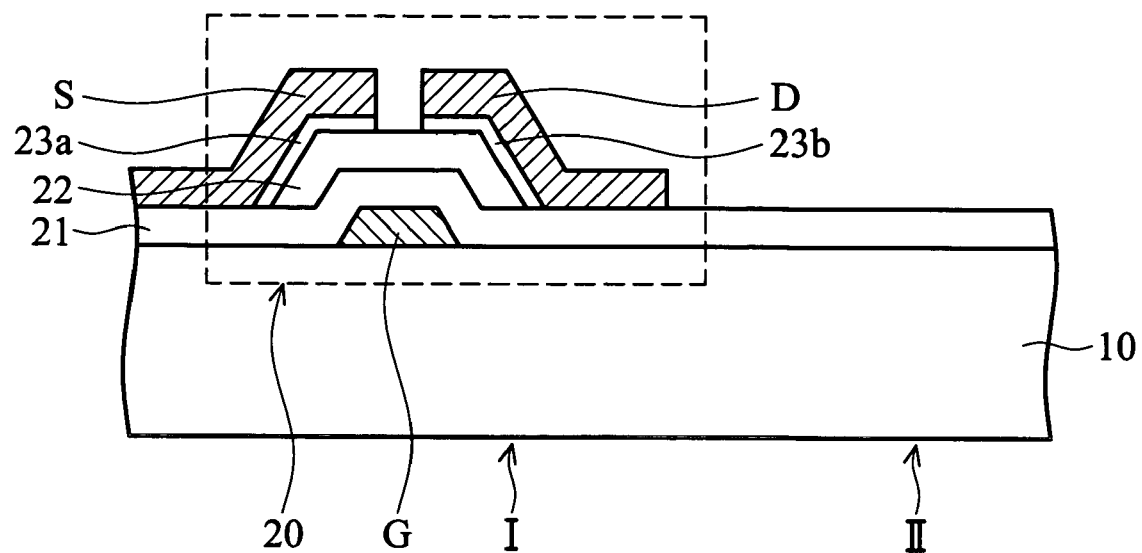
FIGS. 2a to 2c are cross-sections taken along line 2-2 of FIG. 1, illustrating the process flow of fabricating an organic light-emitting diode display according to a first embodiment of the present invention.
Figure 2B:
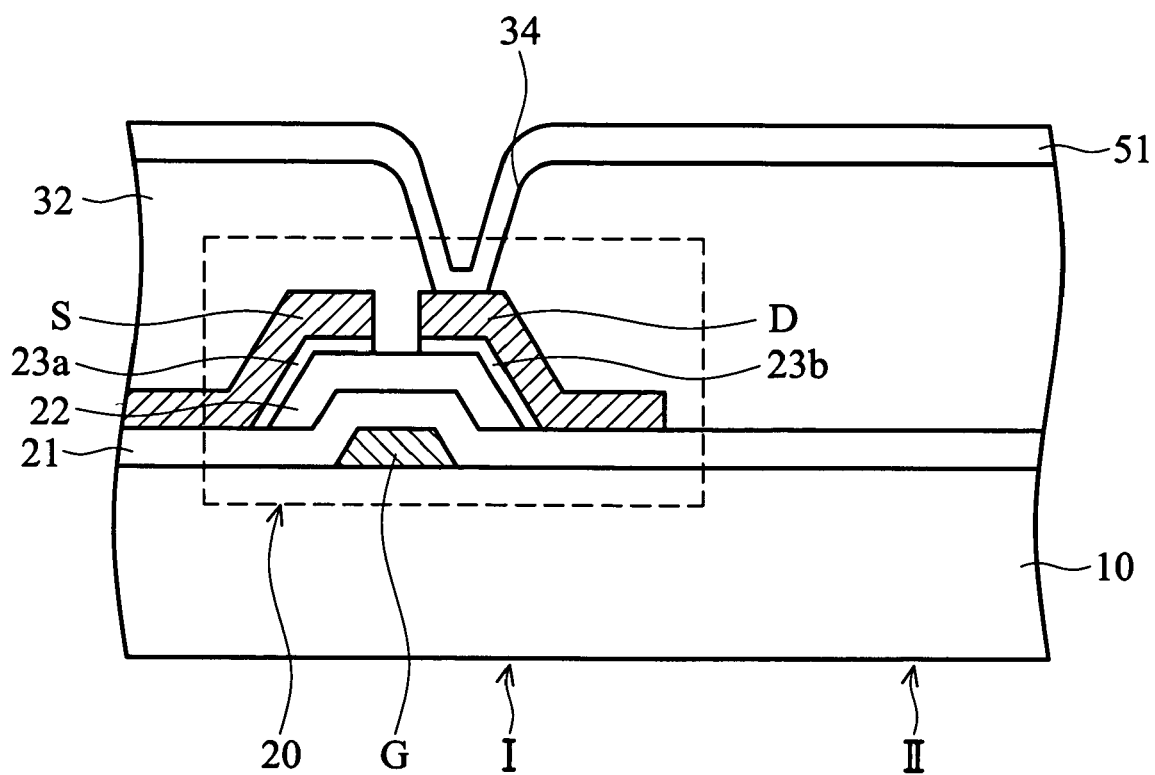
Figure 2C:
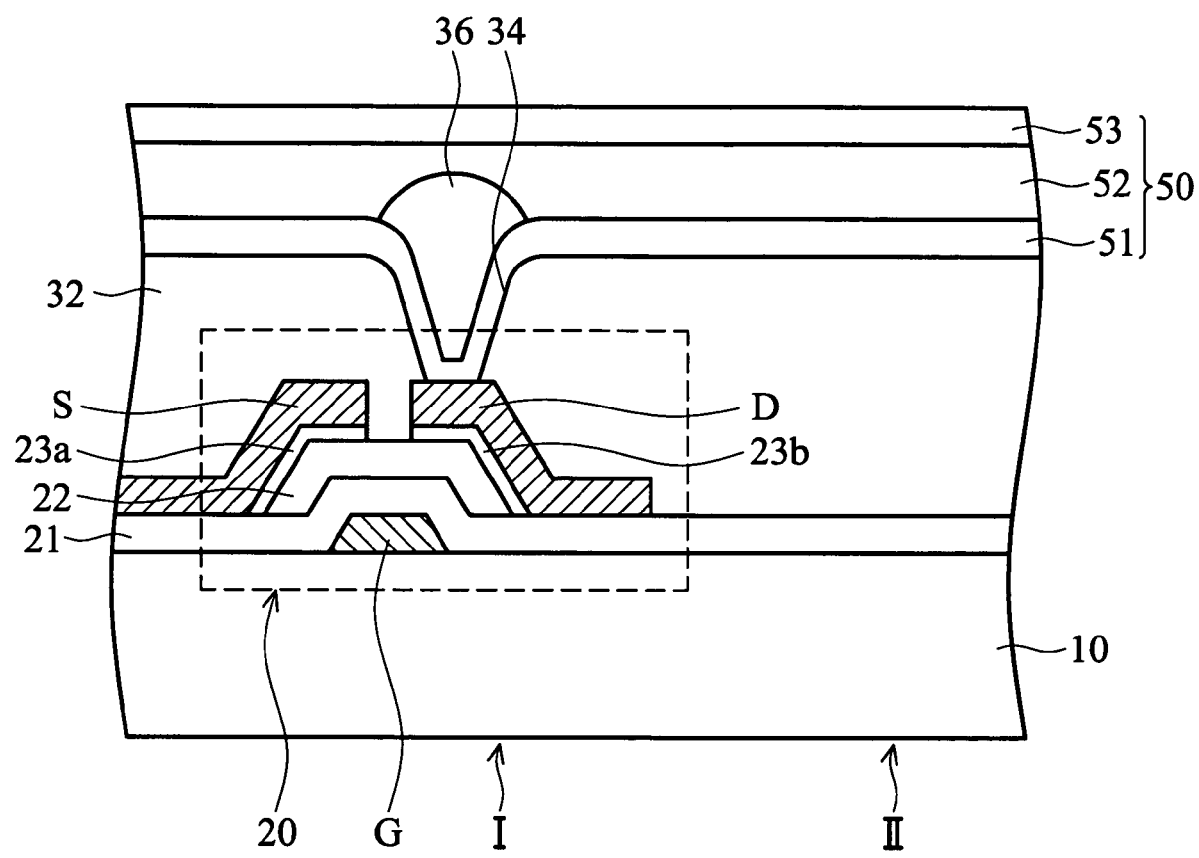

FIG. 1 is a top view of a pixel of an organic light-emitting diode display according to a first preferred embodiment of the present invention, and FIG. 2c is a cross-section taken along line 2-2. In this embodiment, the circuit device is a thin film transistor (TFT) and the display device is an organic light-emitting diode (OLED), as an example, but the invention is not limited thereto.

Referring to FIG. 1, the pixel includes a data line (DL) extending along a Y axis, a scanning line (SL) extending along an X axis, a circuit region I, and a display region II. Referring to FIG. 2c, a substrate 10 includes the circuit region I and the display region II. A circuit device 20 is disposed in the circuit region I of the substrate 10, and a display device 50 is disposed in the display region II of the substrate. For ease of explanation, the circuit device 20 is a TFT and the display device 50 is an OLED, as an example.

The process flow of fabricating the OLED display of the first embodiment is shown in FIG. 1 and FIGS. 2a to 2c. First, referring to FIGS. 1 and 2a, a metal layer M1 (not shown) is formed on the substrate 10 over the entire surface. The metal layer M1 is then patterned by photolithography and etching to form the scanning line (SL) and a gate (G). Next, a gate insulating layer 21, an active layer 22, and a doped layer (not shown) are formed sequentially. Next, the doped layer is defined by photolithography and etching to form a source region 23a and a drain region 23b.

The gate insulating layer 21 can be a single layer of silicon oxide, silicon nitride, or silicon oxynitride (SiON), or a multi-layered structure of a combination thereof. The active layer 22 can be an amorphous silicon layer formed by plasma-enhanced chemical vapor deposition (PECVD) or low pressure chemical vapor deposition (LPCVD) using silane ($SiH_4$) as the reacting gas. The active layer 22 can also be a polysilicon layer formed by first forming an amorphous silicon layer and then performing excimer laser annealing (ELA) at a low temperature. The doped layer can be a doped amorphous silicon layer and can be an $n^+$-type doped layer formed by CVD using silane and $PH_3$ as the reacting gases. The $n^+$-type doped layer provides carriers. Next, the $n^+$-type doped layer is defined by photolithography and etching to form an $n^+$-type source region 23a and an $n^+$-type drain region 23b.

Subsequently, a metal layer M2 (not shown) is formed on the substrate 10 over the entire surface. The metal layer M2 is then defined by photolithography and etching to form the data line (DL), a source electrode S on the source region 23a, and a drain electrode D on the drain region 23b. Thus, a thin film transistor 20 in the circuit region I is complete.

Subsequently, referring to FIG. 2b, a planarizing insulating layer 32 is formed on the above structure to cover the thin film transistor 20. The planarizing insulating layer 32 can be a photoresist material or a dielectric material and can be formed by spin coating. Since the planarizing insulating layer 32 is formed by spin coating, it is thick and provides a flat surface. Thus, subsequently formed film on the planarizing insulating layer 32 is flatter.

Subsequently, a via hole 34 is formed in the planarizing insulating layer 32 to expose the drain electrode D. Next, a transparent anode 51, such as indium tin oxide (ITO), is formed on the planarizing insulating layer 32. The transparent anode 51 simultaneously fills in the via hole 34 to electrically connect to the drain electrode D.

Subsequently, referring to FIG. 2c, a transparent insulating cover layer 36 is formed to cover the transparent anode 51 at the via hole 34 position. Next, an organic light-emitting layer 52 is formed on the anode 51 and the insulating cover layer 36. Next, a cathode 53, such as indium zinc oxide (IZO), is formed on the organic light-emitting layer 52. Thus, an organic light-emitting diode 50 in the display region II of the substrate 10 is complete, and includes the transparent anode 51, the organic light-emitting layer 52, and the transparent cathode 53.

In the first embodiment of the present invention, all layers above the drain electrode D, including the transparent anode 51, the transparent insulating cover layer 36, the organic light-emitting layer 52, and the transparent cathode 53, are transparent. Thus, the drain electrode D is exposed to the display surface. The exposed drain electrode is referred to as a first metal pattern and labeled P1 (as shown in FIG. 1). The exposed first metal pattern P1 is detectable by recognition equipment.

Figure 3:
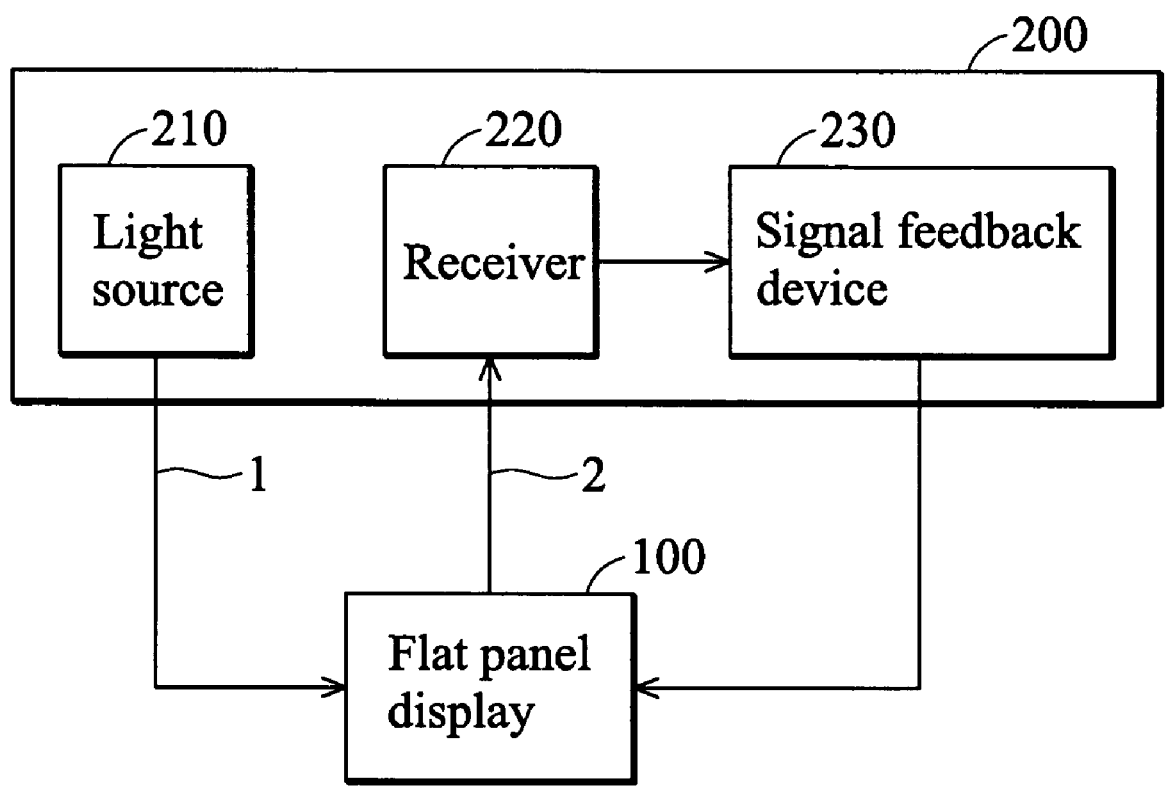
FIG. 3 shows a schematic diagram of a recognition system of the present invention.

FIG. 3 is a schematic diagram of a recognition system of the present invention. The recognition system includes a detectable flat panel display 100 and recognition equipment 200. The detectable flat panel display 100 can be the organic light-emitting diode display of the first embodiment. A first metal pattern P1 is disposed in the circuit region I of the detectable flat panel display 100, with all layers above the first metal pattern P1 transparent. The recognition equipment 200 can be a light pen and can include a light source 210, a receiver 220, and a signal feedback device 230.

The operating principle of the recognition system of the present invention is shown in FIG. 3. When light 1 from the light source 210 irradiates the flat panel display 100, it can be reflected by the exposed first metal pattern (P1). The receiver 220 receives the signal of the reflected light 2 and transmits the signal to the signal feedback device 230. The signal feedback device 230 transmits the signal back to the flat panel display 100. In this way, the position of the light pen on a monitor is detected.

Figure 4:
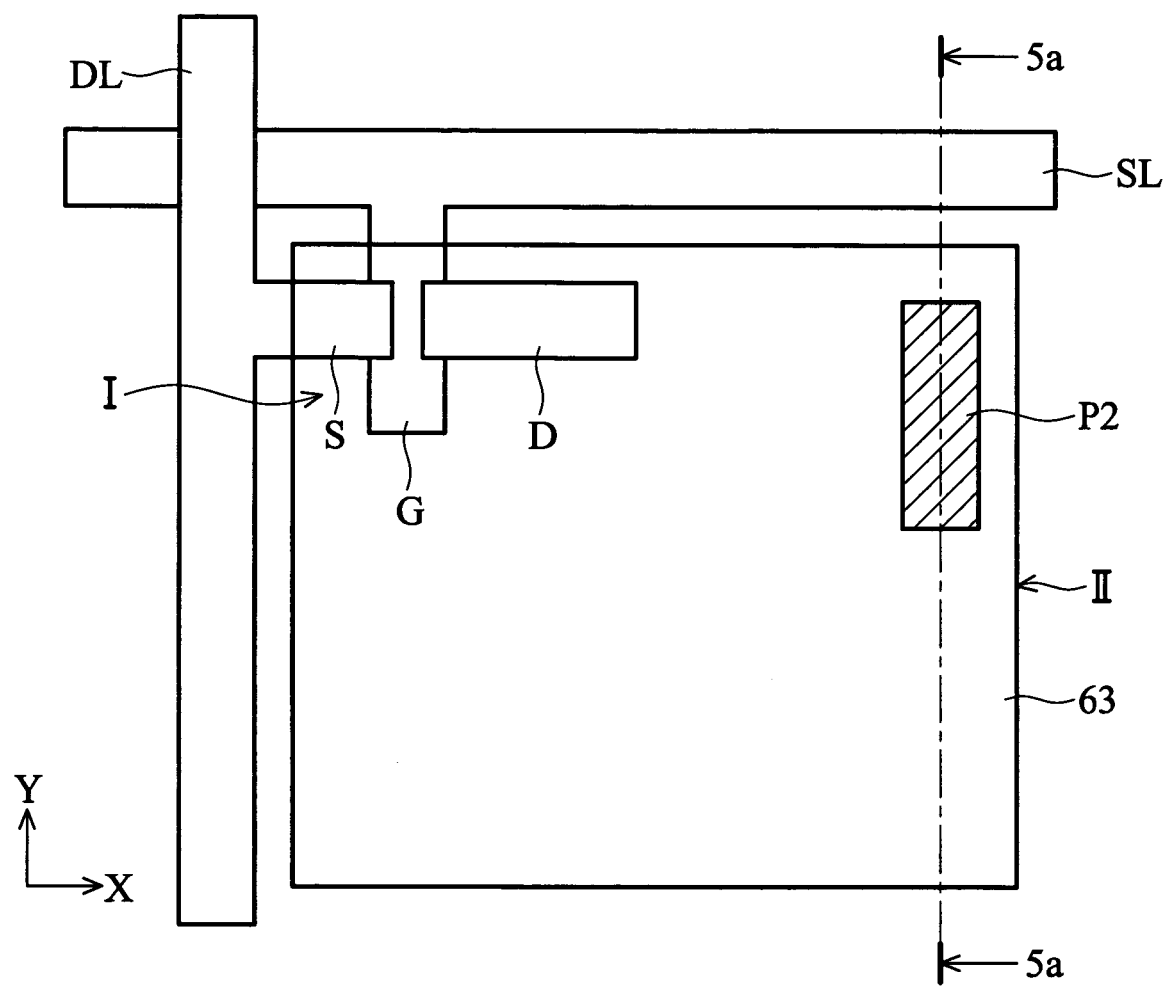
FIG. 4 is a top view of a pixel of an organic light-emitting diode display according to a second embodiment of the present invention.
Figure 5A:
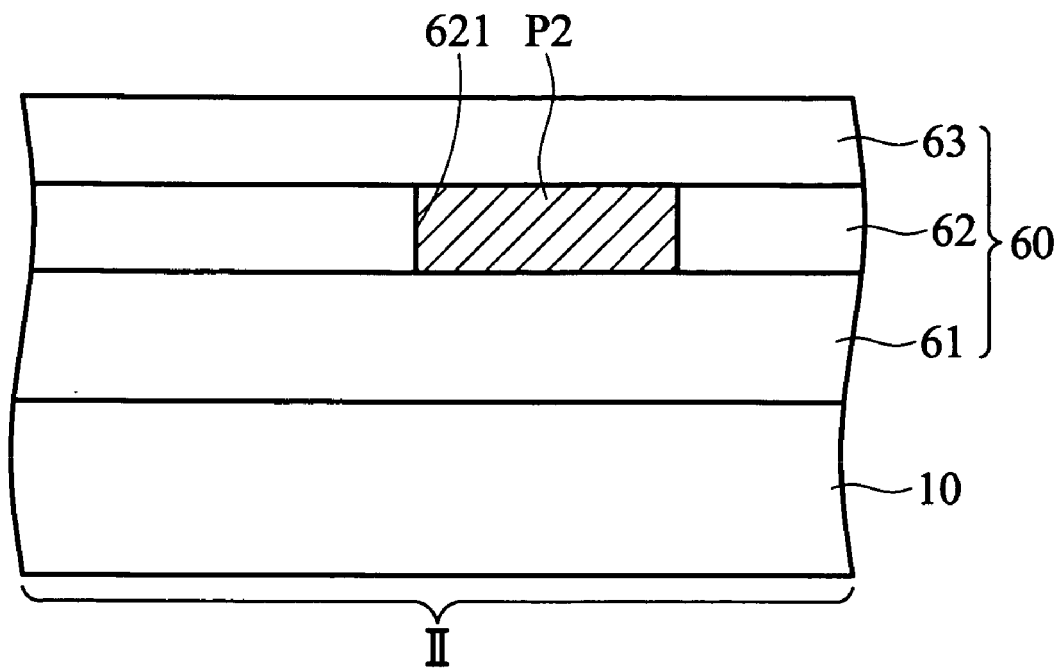
FIG. 5a is a cross-section taken along line 5a-5a of FIG. 4.

FIG. 4 is a top view of a pixel of an organic light-emitting diode display according to a second embodiment of the present invention, and FIG. 5a is a cross-section taken along line 5a-5a. In this embodiment, the circuit device is a thin film transistor (TFT) and the display device an organic light-emitting diode (OLED), as an example, but the invention is not limited thereto.

Referring to FIG. 4, the pixel includes a data line (DL) extending along a Y axis, a scanning line (SL) extending along an X axis, a circuit region I, and a display region II. For ease of explanation, FIG. 5a only shows the display region II. Any suitable circuit device other than a TFT can be disposed in the circuit region I. Referring to FIG. 5a, a display device 60 is formed in the display region II of the substrate 10. For ease of explanation, the display device 60 is an OLED as an example, but the invention is not limited thereto.

The process flow of fabricating the OLED display of the second embodiment is shown in FIGS. 4 and 5a. First, a circuit device is formed in the circuit region I of the substrate 10. For example, a thin film transistor 20 can be formed in the circuit region I according to the method of FIG. 2a, but the invention is not limited to thereto. Specifically speaking, a metal layer M1 (not shown) is formed on the substrate 10 over the entire surface. The metal layer M1 is then patterned by photolithography and etching to form the scanning line (SL) and a gate (G). Next, a gate insulating layer 21, an active layer 22, and a doped layer (not shown) are formed sequentially. Next, the doped layer is defined by photolithography and etching to form a source region 23a and a drain region 23b.

Subsequently, a metal layer M2 (not shown) is formed on the substrate 10 over the entire surface. The metal layer M2 is then defined by photolithography and etching to form the data line (DL), a source electrode S on the source region 23a, and a drain electrode D on the drain region 23b. Thus, a thin film transistor 20 in the circuit region I is complete.

Subsequently, referring to FIG. 5a, an anode 61 and an organic light-emitting layer 62 are then sequentially formed on the above structure. Next, an opening 621 is formed in the organic light-emitting layer 62 and a second metal pattern P2 is filled in the opening 621. Next, a transparent anode 63 is formed on the light-emitting layer 62 and the second metal pattern P2. Thus, an organic light-emitting diode 60 in the display region II of the substrate 10 is complete, and includes the anode 61, the organic light-emitting layer 62, the second metal pattern P2, and the transparent cathode 63.

Refer to FIG. 3, which shows a schematic diagram of a recognition system of the present invention. The recognition system includes a detectable flat panel display 100 and recognition equipment 200. The detectable flat panel display 100 can be the organic light-emitting diode display shown in FIG. 5a. The recognition equipment 200 can be a light pen which includes a light source 210, a receiver 220, and a signal feedback device 230.

In FIG. 5a of the second embodiment of the present invention, the film on the second metal pattern P2 is the transparent cathode 63. Such that the second metal pattern P2 is exposed to the display surface. The exposed second metal pattern P2 is detectable by recognition equipment 200.

The operating principle is the same as that described in the first embodiment. That is, when light 1 from the light source 210 irradiates the flat panel display 100, it can be reflected by the exposed second metal pattern (P2). The receiver 220 receives the signal of the reflected light 2 and transmits the signal to the signal feedback device 230. The signal feedback device 230 transmits the signal back to the flat panel display 100. In this way, the position of the light pen on a monitor is detected.

FIG. 5a shows that although the second metal pattern P2 is not the outermost layer, any layer above the second metal pattern P2 is transparent. Thus, the second metal pattern P2 in FIG. 5a is exposed to the display surface and is detectable by recognition equipment 200.

Figure 5B:
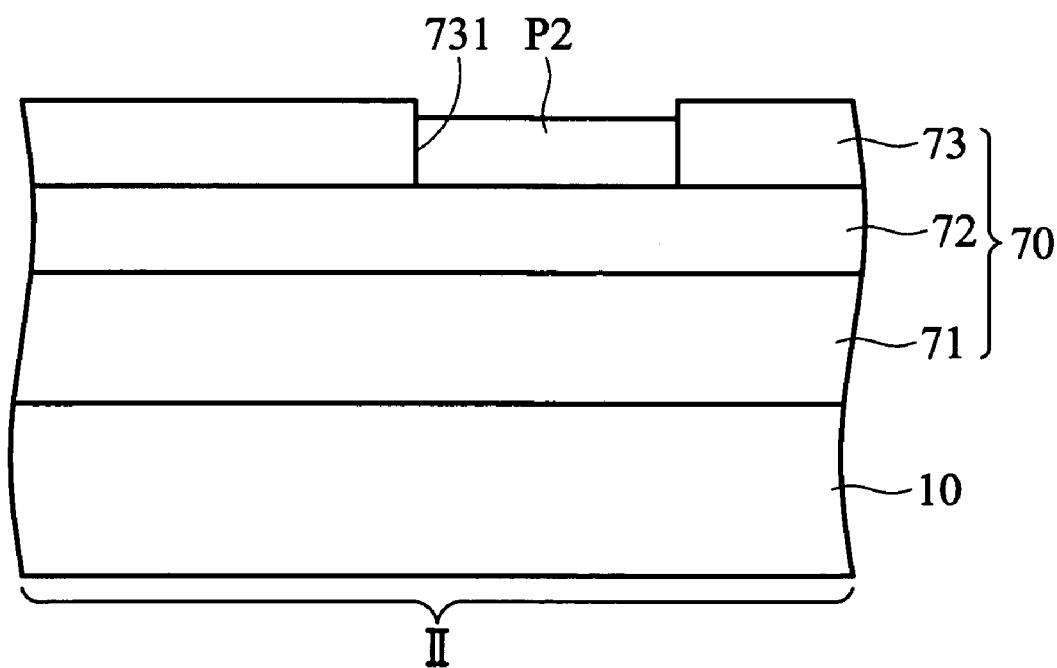
FIGS. 5b and 5c show different arrangements of the second metal pattern.

FIG. 5b shows a different arrangement of the second metal pattern P2 of the second embodiment of the present invention, in which the second metal pattern P2 is the outermost layer. Referring to FIG. 5b, after the circuit device is formed in the circuit region I of the substrate 10, an anode 71, an organic light-emitting layer 72, and a cathode 73 are sequentially formed in the display region II of the substrate 10. Next, an opening 731 is formed in the cathode 73 and a second metal pattern P2 is filled in the opening 731. Thus, an organic light-emitting diode 70 in the display region II of the substrate 10 is complete, and includes the anode 71, the organic light-emitting layer 72, the cathode 73, and the second metal pattern P2.

Refer to FIG. 3, which shows a schematic diagram of a recognition system of the present invention. The recognition system includes a detectable flat panel display 100 and recognition equipment 200. The detectable flat panel display 100 can be the organic light-emitting diode display shown in FIG. 5b. The recognition equipment 200 can be a light pen which includes a light source 210, a receiver 220, and a signal feedback device 230.

In FIG. 5b, the second metal pattern P2 is the outermost layer and exposed to the display surface. Therefore, according to the same principle as mentioned, the exposed second metal pattern P2 can be detectable by the recognition equipment 200 (such as a light pen) as can the position of the light pen on a monitor.

Figure 5C:
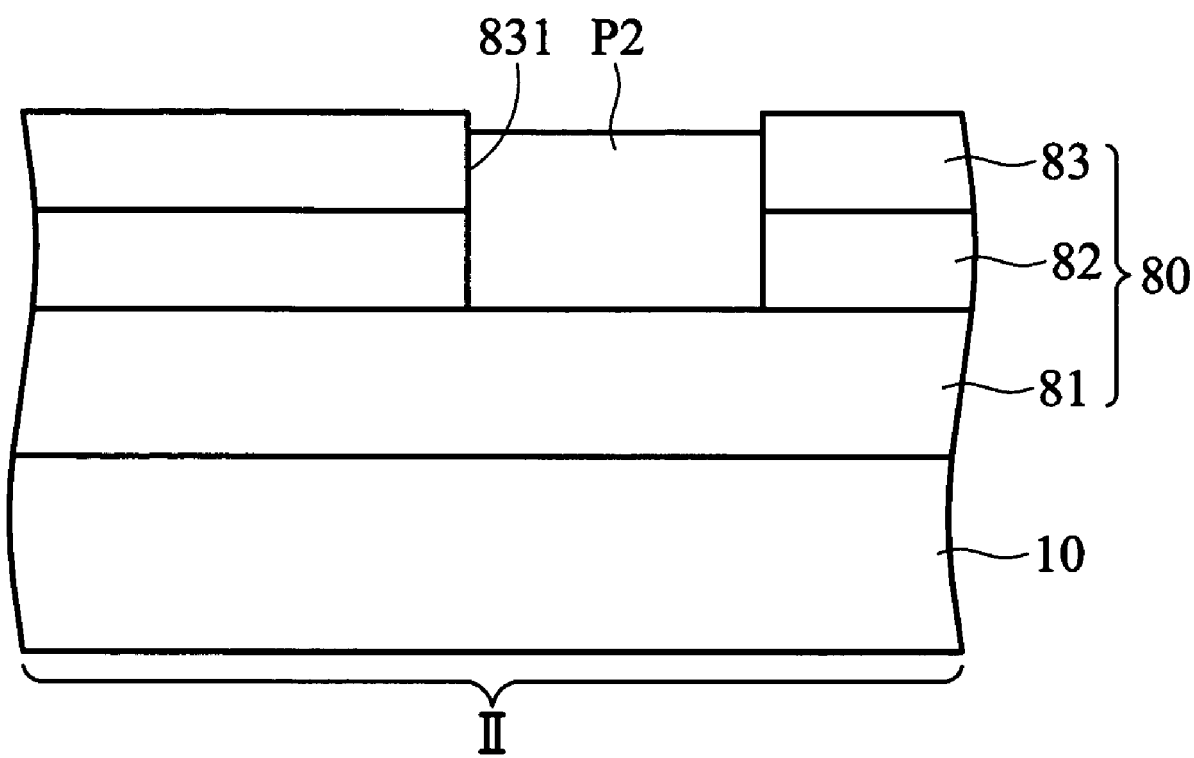

FIG. 5c shows another arrangement of the second metal pattern P2 of the second embodiment of the present invention. Referring to FIG. 5c, after the circuit device is formed in the circuit region I of the substrate 10, an anode 81, an organic light-emitting layer 82, and a cathode 83 are sequentially formed in the display region II of the substrate 10. Next, an opening 831 is formed in the organic light-emitting layer 82 and the cathode 83 and a second metal pattern P2 is filled in the opening 831. Thus, an organic light-emitting diode 80 in the display region II of the substrate 10 is complete, and includes the anode 81, the organic light-emitting layer 82, the cathode 83, and the second metal pattern P2.

Refer to FIG. 3, which shows a schematic diagram of a recognition system of the present invention. The recognition system includes a detectable flat panel display 100 and recognition equipment 200. The detectable flat panel display 100 can be the organic light-emitting diode display shown in FIG. 5c. The recognition equipment 200 can be a light pen which includes a light source 210, a receiver 220, and a signal feedback device 230.

In FIG. 5c, the second metal pattern P2 is the outermost layer and exposed to the display surface. Therefore, according to the same principle mentioned above, the exposed second metal pattern P2 can be detectable by the recognition equipment 200 (such as a light pen) as can the position of the light pen on a monitor.

Figure 6:
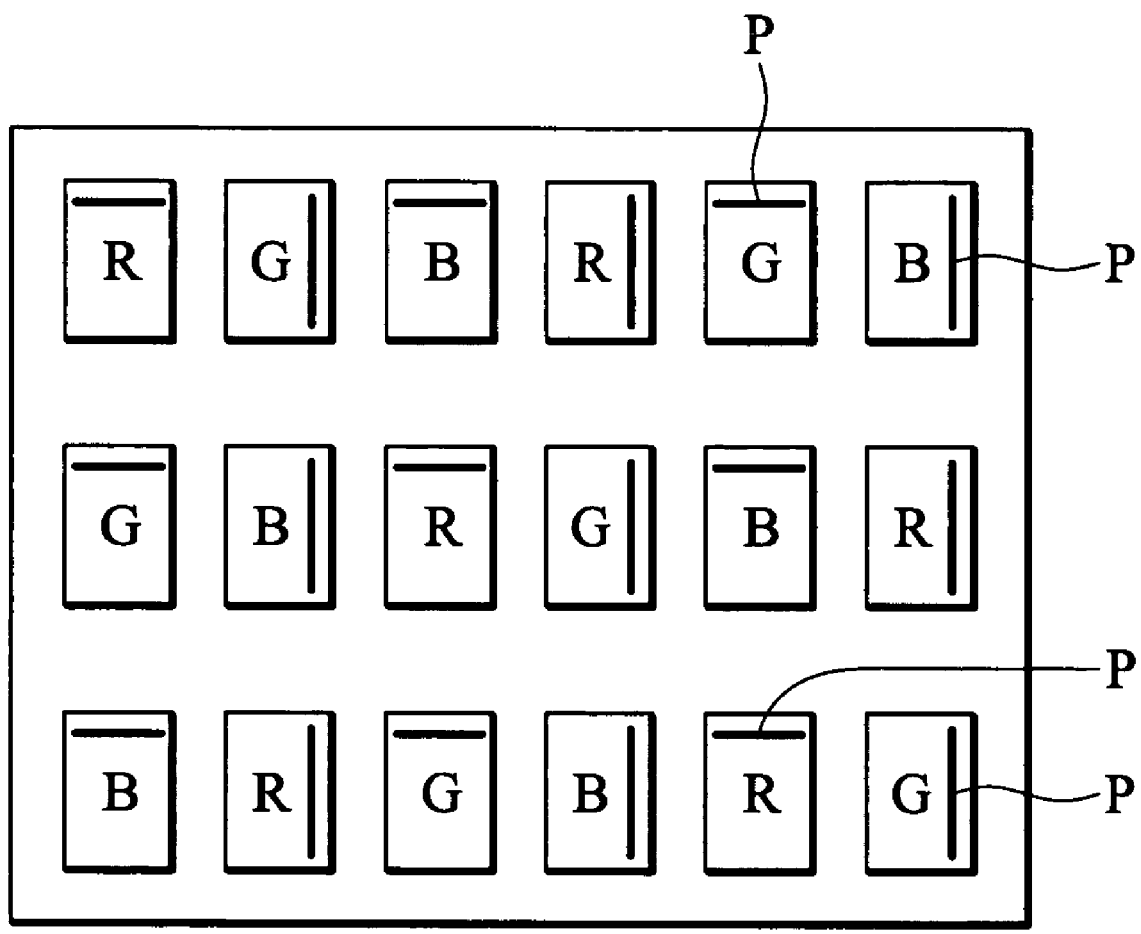
FIG. 6 is top view showing a plurality of pixels of an organic light-emitting diode display of the present invention.

FIG. 6 is a top view of a plurality of pixels of an organic light-emitting diode display of the present invention. As shown in the figure, a metal pattern P is disposed in the circuit device or the display device in each pixel (R, G, or B pixel) according to requirements. Any layers above the metal pattern P are transparent or the metal pattern P is the outmost layer. Thus, according to the principle described above, the exposed metal pattern P can be detectable by recognition equipment (such as a light pen) as can the light pen position on a monitor. The detectable metal patterns P in various pixels can have different positions and arrangement.

In conclusion, a metal pattern is disposed in the circuit or display device of the OLED device of the present invention. Layers above the metal pattern are transparent or the metal pattern is the outmost layer, such that the metal layer is detectable by recognition equipment (such as a light pen). When light from the light source of the light pen irradiates the flat panel display, it can be reflected by the exposed metal pattern. The receiver receives the signal of the reflected light and transmits the signal to the signal feedback device. The signal feedback device transmits the signal back to the flat panel display. In this way, the position of the light pen on a monitor is detected.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A detectable flat panel display, comprising:
   a substrate;
   a circuit device, disposed on the substrate;
   a planarizing insulating layer, at least covering the circuit device;
   a transparent light-emitting element, disposed on the planarizing insulating layer; and
   a metal pattern, disposed in the planarizing insulating layer, capable of reflecting light through the transparent light-emitting element such that the reflected light is detectable by recognition equipment; and
   a transparent insulating cover layer, disposed within and surrounded by the transparent light-emitting element, wherein a projection of the transparent insulating cover layer overlaps the metal pattern.

2. The detectable flat panel display as claimed in claim 1, wherein the projection of the transparent insulating cover layer is only dimensioned to cover the metal pattern for avoiding the reflected light from the metal pattern being interfered by an emitting light from the transparent light-emitting element.

3. The detectable flat panel display as claimed in claim 1, wherein the metal pattern in the planarizing insulating layer is between the circuit device and the transparent light-emitting element.

4. The detectable flat panel display as claimed in claim 1, wherein the transparent light-emitting element comprises:
   a transparent anode disposed on the planarizing insulating layer;
   an organic light-emitting layer disposed on the transparent anode; and
   a transparent cathode disposed on the organic light-emitting layer;
   wherein the transparent insulating cover layer within the transparent light-emitting element is entirely sandwiched between the transparent anode and the organic light-emitting layer.

5. The detectable flat panel display as claimed in claim 4, wherein the planarizing insulating layer comprising a contact window to expose the metal pattern.

6. The detectable flat panel display as claimed in claim 5, wherein the transparent anode is continuously and conformally extended into the contact window for electrically connecting the metal pattern.

7. The detectable flat panel display as claimed in claim 6, further comprising an opening within the contact window, filled with the transparent insulating cover layer.

8. The detectable flat panel display as claimed in claim 1, wherein the circuit device is a thin film transistor.

9. The detectable flat panel display as claimed in claim 1, wherein the transparent light-emitting element is an organic light-emitting diode.

10. A detectable flat panel display, comprising:
    a substrate, comprising a thin film transistor (TFT) region and an organic light-emitting diode (OLED) region;
    a thin film transistor disposed in the TFT region and an organic light-emitting diode disposed in the organic light-emitting diode (OLED) region, wherein the thin film transistor comprises a metal pattern, capable of reflecting light through the organic light-emitting diode such that the reflected light is detectable by recognition equipment;
    a planarizing insulating layer, at least covering the thin film transistor, wherein the planarizing insulating layer comprises a contact window to expose the metal pattern; and
    a transparent insulating cover layer, disposed within and surrounded by the organic light-emitting diode, wherein a projection of the transparent insulating cover layer overlaps the contact window and the underlying metal pattern.

11. The detectable flat panel display as claimed in claim 10, wherein the organic light-emitting diode comprises:
    a transparent anode in the OLED region, continuously and conformally extended into the contact window for electrically connecting the metal pattern;
    an organic light-emitting layer, disposed on the transparent anode; and
    a transparent cathode, disposed on the organic light-emitting layer;
    wherein the transparent insulating cover layer within organic light-emitting diode is entirely sandwiched between the transparent anode and the organic light-emitting layer.

12. The detectable flat panel display as claimed in claim 10, wherein the projection of the transparent insulating cover layer is only dimensioned to cover the contact window and the underlying metal pattern for avoiding the reflected light from the metal pattern being interfered by an emitting light from the organic light-emitting diode.

13. The detectable flat panel display as claimed in claim 12, further comprising an opening within the contact window, filled with the transparent insulating cover layer.

14. The detectable flat panel display as claimed in claim 13, wherein the metal pattern is a portion of a source electrode, a drain electrode, or a gate electrode of the thin film transistor.

15. The detectable flat panel display as claimed in claim 10, wherein the planarizing insulating layer is a photoresist material or a dielectric material.

16. The detectable flat panel display as claimed in claim 15, wherein the planarizing insulating layer is formed by spin coating.

17. A recognition system, comprising:
    a detectable flat panel display; and
    recognition equipment,
    wherein the detectable flat panel display comprises:
    a substrate, comprising a thin film transistor (TFT) region and an organic light-emitting diode (OLED) region;
    a thin film transistor disposed in the TFT region and an organic light-emitting diode disposed in the organic light-emitting diode (OLED) region,
    a planarizing insulating layer, at least covering the thin film transistor;
    a metal pattern, disposed in the planarizing insulating layer, capable of reflecting light through the organic light-emitting diode such that the reflected light is detectable by the recognition equipment; and
    a transparent insulating cover layer, disposed within and surrounded by the organic light-emitting diode, wherein a projection of the transparent insulating cover layer is only dimensioned to cover the metal pattern for avoiding the reflected light from the metal pattern being interfered by an emitting light from the organic light-emitting diode.

18. The recognition system as claimed in claim 17, wherein the recognition equipment comprises a light source, a receiver, and a signal feedback device, wherein when light from the light source irradiates the detectable flat panel display, the light is reflected by the metal pattern, the receiver receives a signal of the reflected light and transmits the signal to the signal feedback device, and the signal feedback device transmits the signal back to the detectable flat panel display.

* * * * *